March 23, 1954
S. C. NELSON
2,672,761
AUTOMATIC VARIABLE TORQUE-SPEED INTERCHANGER
Filed May 13, 1952
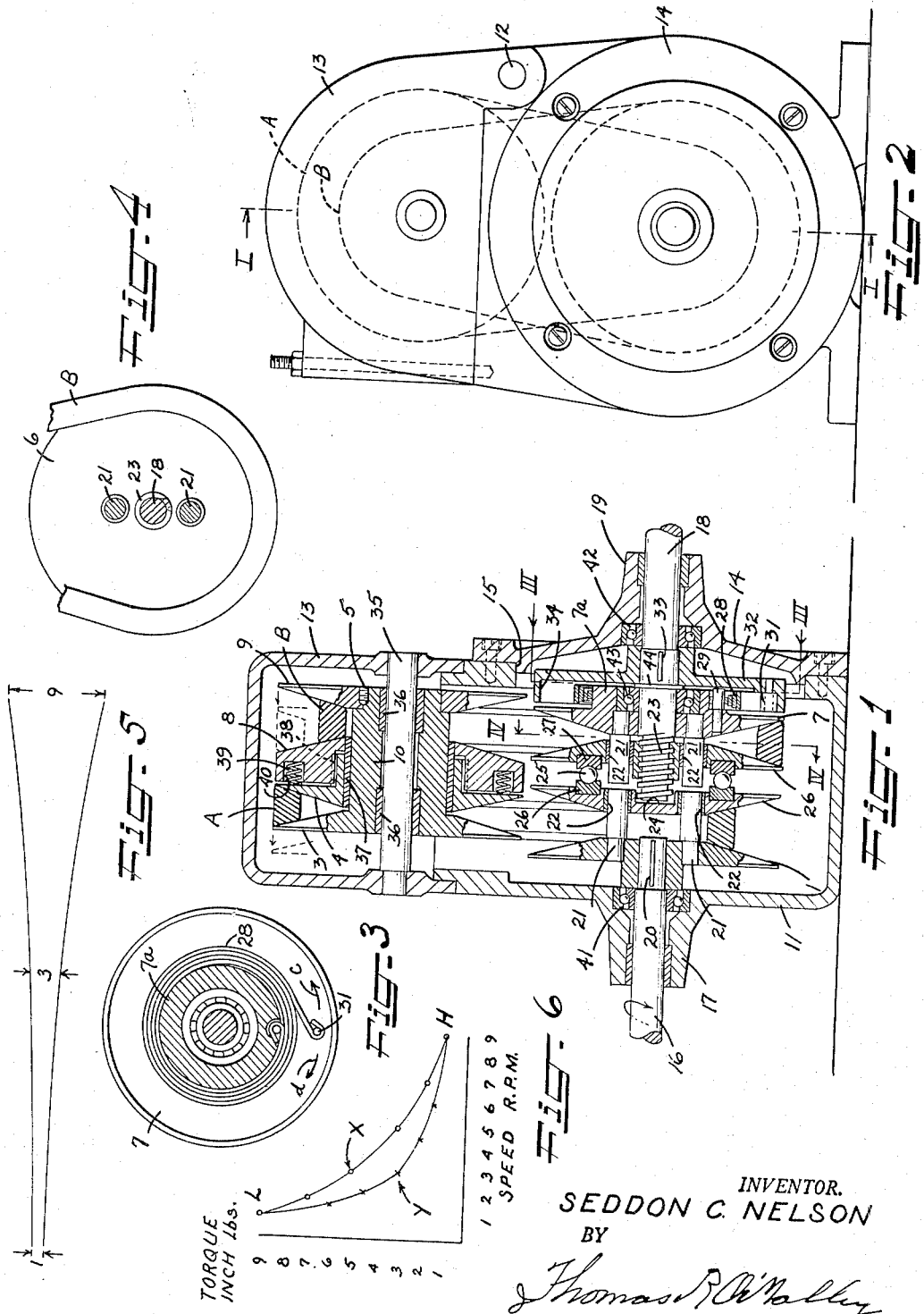
INVENTOR.
SEDDON C. NELSON
BY
Thomas B. O'Malley
ATTORNEY.

Patented Mar. 23, 1954

2,672,761

UNITED STATES PATENT OFFICE 2,672,761

AUTOMATIC VARIABLE TORQUE-SPEED INTERCHANGER

Seddon C. Nelson, Fredericksburg, Va., assignor to American Viscose Corporation, Philadelphia, Pa., a corporation of Delaware Application May 13, 1952, Serial No. 287,462

6 Claims. (Cl. 74—230.17)

This invention relates to an automatic variable speed drive in which the output torque directly controls the speed ratio and vice versa.

It is an object of the present invention to provide a mechanical system for controlling a variable speed drive directly by the torque load. A more specific object of the invention is to provide a variable speed device which is adapted to be driven by a constant speed source of motive power and is automatically controlled in dependence upon the output torque. A more particular object of the invention is to provide a variable speed rotary driving system which is particularly adaptable to the winding of filaments, threads, films or sheets, such as cellophane, rayon, other artificial or synthetic filaments, and films, fabrics, paper, etc., which are continuously delivered from a particular stage of the manufacturing system for such articles, such as from the drying stage. A further object of the invention is to provide a variable speed system which is extremely sensitive to changes in torque load and is adapted to maintain controlled tension upon the material being wound throughout the winding, for example, a constant tension, or a gradually increasing or a gradually decreasing tension during the windup. Other objects and advantages will be apparent from the drawing and the description thereof hereinafter.

In the drawing, which is illustrative of the invention,

Figure 1 is a section taken on line I—I of Figure 2,

Figure 2 is a side elevation of a preferred embodiment of the variable speed system of the invention, Figure 3 is a section taken on line III—III of Figure 2, Figure 4 is a section taken on line IV—IV of Figure 2, Figure 5 is a developed view of a preferred form of spring that may be employed, and Figure 6 is a graph showing the torque and speed relationship.

As shown in Figures 1 to 4, the variable speed system of the present invention may be mounted within a housing comprising a lower casing 11 upon which there may be hingedly mounted at 12 the upper shell 13. A closing plate 14 may be mounted in the opening 15 in one side wall of the lower section 11 to facilitate assembly and dismantling for repair and service purposes. The drive or input shaft 16 may be supported within a suitable bearing 17 formed integrally with the housing section 11 and the driven or output shaft 18 is mounted in a similar bearing 19 formed in the cover plate 14. A variable-pitch or variable-diameter pulley is associated with the drive shaft 16 and comprises a pair of conically-faced pulley halves or cones 1 and 2. A key 20 secures the pulley half 1 to the shaft 16 for rotation therewith and a plurality of pins 21 are press-fit into bores within the pulley half 1 or otherwise secured thereto so that they project axially from the pulley half 1 and are parallel thereto, preferably symmetrically disposed in a circle concentric with the axis of the drive shaft. The opposed pulley half 2 is provided with a plurality of bores 22 corresponding in number to the pins 21 and similarly arranged so that pulley half 2 may slide axially with respect to pulley half 1 on the pins 21. The bores 22 are preferably bushed with a low friction bearing material for the purpose of reducing the resistance to sliding motion.

A similar variable-pitch or -diameter pulley is mounted is concentric relationship to the drive shaft 18. This pulley or sheave comprises a pair of conical pulley halves 6 and 7, the latter of which is provided with pins 21 which are slidably mounted in the preferably bushed openings 22 in the pulley half 6. The pulley system 6 and 7, however, is not keyed directly to the driven or output shaft 18. Instead, the pulley half 7 is freely rotatable upon the inward extension of the shaft 18 and the half 6 is internally threaded for engaging the screw thread 23 formed on the inner end of the shaft 18, which as shown, may project into a recess 24 formed in the pulley half 2. Roller bearings 25 are provided between the races 26 and 27 mounted in the opposed back faces of the adjacent pulley halves 2 and 6 so that relative rotation therebetween is permitted and so that motion of either of pulley halves 2 and 6 toward the other is transmitted to the other. The screw thread is in effect a means for converting relative rotation between the shaft and pulley cones into relative axial motion between the pulley cones and any equivalent cam means may be substituted therefor.

The pulley system 6—7 is connected to the driven shaft by means of the torsion spring 28, the inner end of which is secured to the hub 7a of pulley half 7 such as by means of the pin 29. The spring surrounds the shaft 18. The outer end of the spring 28 is secured to a flanged disc or cup 30 such as by means of the pin 31 secured to the flanged disc at 32 which in turn is keyed as at 33 to the shaft 18. The outer flange 34 of the cup 30 extends around the hub of the pulley half 7 so as to confine the spring within the annular space therebetween. The inner face or wall of the flange is a cylindrical surface which is opposed to and spaced in a concentric relationship to the outer cylindrical surface of the hub 7a. However, this relationship may be reversed so that the disc would provide the hub having the outer cylindrical surface and the flange could extend laterally from the rim of the pulley core 7 to provide the inwardly facing cylindrical surface for enclosing the torsion spring in the annular space between said surfaces. While a spiral spring is shown, a helical spring may as well be used, the annular space being extended axially to provide the desired confinement.

The pins 21 prevent any relative rotation of any pulley half or disc with respect to its mate.

In the upper housing section 13, there is fixedly mounted a cross shaft 35 upon which there is axially slidably mounted an intermediate pulley means or system which may comprise two pulleys of fixed pitch and suitable tension pulleys to take up slack in the belts which embrace the two fixed pulleys and the cooperating variable pitch pulleys on the input shaft and output shaft respectively. However, in the preferred embodiment shown this pulley means comprises four pulley halves 3, 4, 8 and 9. The halves 3 and 9 may be connected together in the form of a spool, as shown, in which the half 9 is secured to the hub 10 of pulley half 3 by means of a set screw 5. The hub 10 may be bushed internally at each end as at 36 to allow free sliding motion of the pulley system along shaft 35. Pulley half 4 may be provided with a hub 37 upon which the pulley half 8 may be slidably mounted by means of splining as at 38. Springs 39 in recesses 40 within pulley half 8 may be provided to urge pulley halves 4 and 8 away from each other.

Belts A and B of the V-type having tapered side walls may be provided for connecting the pulley systems together. Belt A embraces the opposed conical faces of the pulley halves 1—2 and 3—4 while belt B embraces the opposed conical faces of pulley halves 6—7 and 8—9. Thrust bearings 41 and 42 are provided in the bearings 17 and 19 respectively. A thrust bearing 43 is provided in the pulley half 7 and bears against a collar 44 on the shaft 18 so as to take the thrust between the pulley half 7 and the shaft 18.

In the relationship of the various parts shown, the devices are in the low speed, high torque position. Figure 3 shows the wound up relationship of the spring 28 about the hub 7a of the pulley half 7 which is rotating in a counterclockwise direction as shown in Figure 3. The arrow c indicates the relative rotation of the shaft with respect to pulley 6—7 that occurs when the parts are shifted into the high speed, low torque position. The arrow d represents the direction of rotation of the shaft with respect to the pulley 6—7 that was required to place the parts in the position shown where the low speed, high torque condition exists.

The system operates as follows:

The input shaft turns split pulley 1—2 which drives V-belt A turning idler pulley assembly 3—4 and 8—9. This drives belt B to pulley 6—7 which winds up the torque spring 28. The spring then drives the cup or plate 30 keyed to the output shaft. Output speed is determined by the output torque which reacts against the spring 28. If the torque required is high, the spring is wound up tight as shown in Fig. 3. This setting gives the lowest output speed.

When the four pulleys have a minimum effective diameter of 1½ inches and a maximum diameter of 2⅝ inches, the speed reduction is 3 to 1. If the load (output torque) is reduced, the spring 28 will unwind, turning the output shaft slightly faster than pulley 6—7, causing the screw 23 at the inner end of the output shaft to force cone 6 axially to the left. This pushes cone 2 on the input shaft to the left. Thus, belt B is allowed to move radially inward on pulley 6—7 and belt A is forced radially outward on pulley 1—2. Belt A is then pulled radially inward on pulley 3—4, causing cone 3 to slide axially to the left on the idler shaft. Since cone 5 is rigidly attached to cone 3, it also moves to the left, forcing belt B to climb radially outward on pulley 8—9, thus, simultaneously completing the change. If the load is light enough, the spring 28 will unwind to the limit of its travel and the speed increase will be 1 to 3. If the load is somewhere between these limits, the spring 28 and the load will reach equilibrium at some intermediate speed. This gives an overall range of output speed in the ratio (3/1) to (1/3) or 9 to 1.

During these changes, the double cone assembly 4—8, although slidable on spool piece 3—9, does not appreciably change its axial position because this is the position which maintains perfect alignment of the belts. The barrel of the spool merely slides through the assembly 4—8 which, through its splining 38, transmits its share of the load from the inside of belt A directly to the inside of belt B. The other half of the load is transmitted from the outside of belt A to the outside of belt B through spool 3—5. This provides for simplicity of manufacture of the idler pulley assembly.

The drawing shows that all outward belt thrusts are carried through ball bearings 41, 42, 43 to the housing.

Cone 2 is driven from cone 1 by means of two driving pins 21 on which cone 2 is free to slide. In like manner, cone 6 transmits its share of the load through two driving pins 21 to cone 7. Thus, each cone carries half the load. During speed changes, the shifting force (difference between output torque and spring torque on 28) must overcome the friction at the drive pins 21 in addition to forcing the belts outward. For quick response, this friction should be a minimum. Therefore, Oilite bushings are preferably provided in bores 22 for the drive pins to slide in.

The spring 39 urges pulley halves 4 and 8 apart to take up any slack or growth in belts A and B such as the small variation in belt length between the intermediate 1 to 1 speed ratio position and the extreme speed ratio positions. However, a slight crown of about $\frac{1}{32}$" at the center running position on all pulley cones would equalize both belt lengths for all ratios. The cone slope would then vary from about 14° to 16°.

Another advantage inherent in the design is the fact that under constant load conditions there is no axial thrust on the screw thread 23. By mounting the input and output shafts on the same axis, it is possible to put a ball thrust bearing 25 between discs 2 and 6 so that belt thrusts exactly cancel each other. The screw threads 23 carry no thrust nor driving loads and at constant speed, no load whatsoever. Only when there is an output torque change is any load applied to the threads. Thus, the torque difference has only small friction forces on the screw threads (generated by its own action) to overcome to shift the speed ratio. It is thus responsive to minute torque changes. This thrust balancing action is a bit complicated, involving a compensating action of the unique idler pulley. It may appear at first glance that, except when the belts are in the middle of the range and traveling at the same speed, the tensions on the load side of the two belts would be different and cause different side thrusts. However, the action of the idler pulley assembly 3—4, 8—9, compensates for this. There can be no unbalanced side thrust in the idler pulley on the double cone 4—8 for if there were, it would merely yield to it and slide axially until these thrusts were equal and opposite. In so doing, it would increase the tension in the slack side of the belt carrying the lighter load, until the sums of the tensions on the two sides of both belts were the same. This combination of belt tensions would then exactly equalize the opposite thrusts against cone 2 and cone 6 and remove any axial thrust from the screw 23. This results in a smooth, highly responsive action since friction is at a minimum. The only load imposed on the screw threads 23 is the force required to overcome friction at pins 21 and shift the belts. Small torque forces will, therefore, have small friction forces to overcome (large ones larger, but still relatively small). Thus, the response to minute changes of load should be excellent.

When a torque spring 28 of uniform stiffness is employed in the device, the relationship between the torque and the speed is represented by the curve LXH in Figure 6 where X corresponds to the 1 to 1 ratio of input to output speeds, assuming the input speed is 3 R. P. M. and the output speed ranges from 1 to 9 R. P. M. Points L and H would correspond to the low and high output speed positions. In order to produce a constant tension in the material being wound up when the device is used for driving a winding machine, it is preferred to provide a spring which would vary in stiffness so as to approach more closely the characteristics shown in the curve LYH in Figure 6 where the product of speed and torque is substantially constant throughout the range of speed variations. This may be obtained by providing a spring of varying stiffness such as shown in Figure 5 in which the width of the spring varies gradually from unity at one end through thrice the width in the middle to 9 times the width at the other end. Such a spring would be mounted with the narrow width secured to the hub of pulley half 7 and the wider width secured to the disc or cup 30. Obviously, if a gradually decreasing tension were desired during the wind-up, variations from this construction of spring may be made. When the device is used for driving a winding machine, the diameter of winding gradually increases and this affects the torque or load upon the output shaft 18 which in turn influences the variable speed device through the torque spring 28 and the proper design of the spring, as illustrated in Figure 5, makes it possible to produce either constant tension, gradually increasing tension or gradually decreasing tension (the first and last usually being preferred in most cases) during the build-up of the winding from a small to a large diameter on the core.

The device of the present invention is also quite useful for driving motor vehicles, such as automobiles, motorcycles, scooters, etc. which are driven by internal combustion motors. When this device is interposed between the crank shaft of the motor and the drive shaft of the vehicle, it would shift in dependence entirely on torque, regardless of speed. When accelerating from a stand-still, the torque demanded would be a maximum so it would shift into low as desired. At medium speed if acceleration were demanded by opening the throttle, the torque would increase and shift the drive toward a lower gear. Running at high speed at light load or down-hill it would shift on up into very high gear analogous to over-drive and allow the engine to idle along slowly. In other words, it would be active at all speeds, accommodating itself to the torque demanded and letting the engine run as slowly as possible under all conditions. By allowing the engine to run at slower speeds for low power requirements (torque times speed=power) the average engine torque will be increased. It is a well known fact that a gasoline engine operates at maximum efficiency when the torque is a maximum. The reverse is obviously true, that the efficiency is zero if the torque is zero. Therefore, if the average torque for all conditions can be increased, the efficiency and miles per gallon will be increased. This drive accomplishes this and at the same time provides for a quick automatic shift to a lower ratio if a greater output torque is demanded for climbing or sudden acceleration.

It is to be understood that changes and variations may be made without departing from the spirit and scope of the present invention as defined in the appended claims.

I claim:

1. An automatic variable speed drive system comprising an input shaft, an output shaft, a variable pitch pulley secured to the input shaft for rotation therewith, a variable pitch pulley comprising a pair of relatively movable cones movably mounted on the output shaft, a torsion spring connected to the output shaft and one of the cones for transmitting motion from said cone to said shaft, means interconnecting the other of said cones with the output shaft for imparting relative axial motion between the cones to vary the pitch of the pulleys in response to relative rotation between the output shaft and said cones, means for transmitting relative axial motion between said cones to the first-mentioned pulley to vary its pitch in response to said motion, intermediate pulley means, and belt means for transmitting motions from the first-mentioned pulley through the pulley means to the pulley on the output shaft.

2. A system as defined in claim 1 in which the shafts are coaxially disposed, the first-mentioned variable pitch pulley comprises a cone fixed on the input shaft and a cone axially movable with respect to the fixed cone, the two axially movable cones are juxtaposed and a thrust bearing is disposed between them.

3. A system as defined in claim 1 in which each variable pitch pulley comprises a pair of relatively axially movable cones and means for preventing relative rotation between the cones.

4. A system as defined in claim 2 in which each variable pitch pulley comprises a pair of relatively axially movable cones and means for preventing relative rotation between the cones.

5. A system as defined in claim 1 in which the intermediate pulley means comprises a pair of variable pitch pulleys mounted on a common shaft parallel to the input and output shafts, and said pulleys comprise two outer fixed cones and two intermediate cones axially slidably mounted with respect to the outer cones.

6. A system as defined in claim 1 in which the intermediate pulley means comprises a pair of variable pitch pulleys axially slidably and rotatably mounted on a common shaft parallel to the input and outputs shafts, and said pulleys comprise two outer fixed cones and two intermediate cones axially slidably mounted with respect to the outer cones, resilient means between the intermediate cones for urging them apart axially, and means for preventing relative rotation between the intermediate cones.

SEDDON C. NELSON.

References Cited in the file of this patent

FOREIGN PATENTS

| Number | Country | Date |
|---|---|---|
| 30,003 | Great Britain | Pat of 1912 |
| 607,471 | France | Mar. 27, 1926 |
| 875,582 | France | June 29, 1942 |